Patented Jan. 19, 1954

2,666,771

UNITED STATES PATENT OFFICE 2,666,771

CATALYZING ORGANIC ISOMERIZATION REACTIONS WITH ACTIVE MAGNESIA

Albert C. Zettlemoyer and William C. Walker, Bethlehem, Pa., assignors to Food Machinery and Chemical Corporation, New York, N. Y., a corporation of Delaware No Drawing. Application December 9, 1948, Serial No. 64,432

3 Claims. (Cl. 260—405.6)

This invention relates to improvements in catalytic processes. More particularly it is directed to decompositions, additions, substitutions and the like involving organic compounds in reactions subject to basic catalysis wherein magnesia in an active form is employed.

Catalytic reactions of the type with which the invention is in part concerned have ordinarily involved the use of metallic catalysts supported on solid adsorbents generally of amphoteric nature. Because of the highly basic and reactive nature of the magnesia catalysts employed in the instant processes, superior results can often be obtained and in other instances entirely different and highly desirable results can be accomplished.

Broadly considered, the invention involves carrying out chemical reactions involving organic compounds, by bringing together the compounds to be reacted under reactive conditions in the presence of magnesia of an activity indicated by an iodine number of at least 30, causing the compounds to react by the catalytic action of said magnesia, and separating the reactants from the magnesia.

Magnesia in the common form described or referred to in every text on inorganic chemistry is a very inactive, water insoluble compound which though useful in many fields is of no practical value in the catalytic field except as a carrier for catalysts. Active magnesia has been produced for some time by the owners of the present invention and during the latest world war a magnesia supplied by them having an iodine number below 25 was employed catalytically as a support or catalytic activator for heavy metal catalysts in the preparation of styrene from ethyl benzene in the synthetic rubber program. This use is referred to briefly in an article entitled "Active Magnesia" by the present applicants appearing in Industrial and Engineering Chemistry, volume 39, page 69, January 1947.

An object of the present invention is to provide a new or improved series of organic reactions in which magnesia more effective than those heretofore used are employed alone or as a principal catalyst for their power in improving known type reactions or causing new reactions of organic compounds. Another object is to provide highly active basic catalysts capable of altering the course of known type reactions in order to provide new or greater quantities of desired products.

The reactions subject to basic catalysis with which the present invention is concerned may be more specifically defined as isomerizations, aldol condensations, dehydrations and hydrolysis, decarboxylations and dehydrocarboxylations, dehydrohalogenations and halogenations, deaminations and aminations and esterifications.

The magnesias employed in these processes may be produced in a number of ways and the invention in its broad applications is independent of the method of their production. However, in specific adaptations certain magnesias either produced by a particular process or derived from particular magnesium compounds are required or are preferred.

Particularly effective magnesias are those which are pseudomorphic of magnesium hydroxide having a very high iodine number of from 185 to about 300 and an ignition loss of from 5 to 12%, which magnesias are produced by a novel process defined in copending application Serial Number 64,433, filed on December 9, 1948, by the present applicants and Walter J. Riley, now Patent No. 2,606,816. Magnesias produced by the burning of magnesite, magnesium carbonate or precipitated magnesium hydroxide may also be employed providing the activity is adequately high to provide catalytic potency, which desirably is an activity indicated, as hereinbefore stated, by an iodine number of at least about 30.

Example 1

Diacetone alcohol was vaporized in a still and the resulting vapors were then passed through a heated catalytic chamber through and in contact with an active magnesia having an iodine number of 130 wherein the temperature was at 350° C. The effluent gases were passed through a condenser from which hexadiene was obtained. By recycling the gases over the magnesia the yields are improved.

Other unsaturated compounds such as cyclohexene and isobutene may be obtained by similar treatments from the corresponding alcohols, or cyclohexanol and isobutyl alcohol. Secondary and tertiary alcohols are more readily converted than the primary alcohols.

Hydrolysis as well as dehydration may be accomplished with the aid of the active magnesium oxide catalyst, as for example alkyl halides in admixture with water will give the corresponding alcohol.

Example 2

Acetone is flowed through a bed of active granular magnesia having an iodine number of 134 wherein the temperature is maintained at about 34° C. By such treatment a portion of the acetone is converted into diacetone alcohol. In order to convert a further quantity of the acetone in the acetone-diacetone alcohol mass obtained, such mass is distilled to separate the acetone, the vapors of which are thereafter condensed and at a temperature of about 34° are passed again through the said catalytic bed. As compared to processes using known catalysts, the efficiency or rate of conversion in the present process of the acetone to the diacetone alcohol is superior to a highly satisfactory extent.

The active magnesia catalytic procedure of the invention is applicable to aldol condensations in general as well as to similar reactions involving the migration of active hydrogen atoms. Alcohols can be produced from aldehydes by mixed aldol condensations either in the gaseous phase or liquid phase. In the gaseous phase dehydration usually occurs at the same time. For example, acetaldehyde and propylaldehyde can be reacted to produce an unsaturated alcohol which can be subsequently hydrogenated to yield hexyl alcohol. Aromatic aldehydes such as benzaldehyde may be reacted with an aliphatic aldehyde such as acetaldehyde or a ketone such as acetone to provide compounds such as cinnamaldehyde and benzyl acetone which in turn may be converted into cinnamic acid. Furthermore, aromatic aldehyde may be reacted with aliphatic dibasic acids such as malonic acid to provide unsaturated aromatic dibasic or monobasic acids. Also hydroxy aromatic aldehydes such as o-hydroxy benzaldehyde may be reacted with anhydrides such as acetic anhydride to provide compounds of the nature of coumarin. Formaldehyde may be reacted with acetaldehyde or other aldehyde or with acetone or other ketone in the gaseous phase to provide vinyl aldehyde or unsaturated ketones, such as ethylenyl-methyl-ketone. Aliphatic alcohols may be reacted with aldehydes or with ketones to produce acetals. Finally as to reactions of the aldol type, acetylene may be caused to react with ketones, such as acetone, to provide hydroxy propyl acetylene which in turn due to the presence of one remaining active hydrogen atom can be reacted with one more molecule of acetone to provide vinyl acetone.

Example 3

A mixture of phenyl acetic acid and acetic acid in the mole ratio of 1 to 5 was vaporized, preheated and passed through a reaction zone containing active magnesia having an iodine number of 130. The product obtained was then purified to separate any unreacted acid and to provide phenyl acetone in purified condition. The amount of phenyl acetone collected represented 70% conversion of the phenyl acetic acid.

Acetic acid can be converted into acetone in the vapor phase in the presence of the active magnesias of the present invention maintained at a temperature of about 345° C. Furthermore, adipic acid can be treated in its molten state with the active magnesia of the present invention and cyclopentanone will be obtained. Yields of about 82% have been obtained when a particularly active magnesia was employed.

Example 4

Castor oil and magnesia of the activity herein described were heated together at a temperature of 310° C. and by such treatment dehydration of the oil occurred and a large percentage of conjugated fatty acid residues was obtained. For example, an active magnesia of iodine number 210 produced about 3% higher amount of conjugated fatty acid than present commercial castor oils of the same viscosity contain. This is a substantial increase as far as properties such as drying time are concerned.

Example 5

Butyl alcohol and acetic acid in a mole ratio of 2:1 are passed through a bed of active magnesia of an iodine number of 130 at a space velocity of 482, the bed being contained in an annular zone between two vertically concentric tubes of inactive material such as glass and supported inside a vertically-mounted combustion furnace. With the bed held at a temperature of 300° C., the alcohol and acid react to form the ester in good yield.

Other esterification reactions may be carried out in like manner using experimentally-determined suitable temperatures and velocities in apparatus of the same or different structure.

Example 6

Vapors of 2,4-pentanediol are passed through a bed of active granular magnesia of 8 to 20 mesh maintained at a temperature of $358\pm5°$ C. As a result dehydration occurs resulting in a mixture of partially dehydrated unsaturated alcohol and of doubly unsaturated hydrocarbon both corresponding to the dihydroxy alcohol treated. In like manner other alcohols may be dehydrated at the same or other higher or lower temperatures.

Example 7

Acetone and active magnesia are placed in a Parr Hydrogenator and acetylene is introduced until a pressure of 50 p. s. i. is indicated on the gauge. After agitation over an extended period, it will be found that the product contains an unsaturated material having a boiling point higher than that of the acetone, the product apparently being hydroxypropyl acetylene and/or di(hydroxypropyl) acetylene. Much higher pressures may be employed for increasing the yields of these or similar addition products using the same or other corresponding reactants.

Example 8

Linseed oil containing about 1% of active magnesia is heated under an inert atmosphere to a temperature of 300° C. for approximately 30 minutes. As a result the linoleic and linolenic acid groups in the oil are partially isomerized. The treated oil bodies more rapidly and its refractive index rises more rapidly than oil treated similarly but in the absence of the magnesia. In a similar manner other unsaturated glyceride oils may be treated at the same or different temperatures for different periods in the presence of magnesia to bring about isomerization.

Experimentation with the active magnesias of the present invention indicates that they are effective in catalyzing the reactions described below wherein the procedures and conditions of reactions will be the same or similar to the conditions set out in the above examples or the conditions will be of the nature of those employed in known catalytic reactions of the same reactants.

Butene-1 may be converted into butene-2 by heating the same to a high temperature in contact with the active magnesia. Carbon-to-carbon double bonds in other hydrocarbons may also be made to shift thereby to produce different hydrocarbons, as for example, 1 phenylbutene-2 to 1 phenyl-butene-1 and safrole to isosafrole and eugenol to isoeugenol.

Amines may be produced by passing the corresponding amide to be converted and bromine in steam gas phase over the active magnesia, the intermediate product RNCO being converted to the amine by hydrolysis in which $CO_2$ is liberated.

One mole of benzene and about 3 moles of ethyl bromide are reacted in the presence of the active magnesia and triethyl benzene is obtained. Similarly other aromatics and other halogenated organic compounds may be reacted to cause substitution on the ring, as for example acetyl chloride in reaction with benzene and active magnesium oxide may produce acetophenone.

The process is likewise applicable to reactions between hydroxy aromatics and halogenated organic compounds, as the reaction of phenol with propionyl chloride or with propenyl chloride at elevated temperatures by which procedure the organic radical of the chloride joins on the aromatic ring in either the para or ortho positions.

In another example methyl chloride and benzene or other aromatic hydrocarbon are passed vapor phase into contact with the active magnesia. Also ring substitution can be effected by reacting a halide of the aromatic compound as chlorobenzene with hydroxyl amine to produce, after rearrangement, p-amino phenol.

Chlorobenzene is mixed with hydroxyl amine and the active magnesia of the present invention. Reaction occurs and the rather stable phenyl hydroxyl amine obtained rearranges to form p-amino phenol. In addition to the reaction of chlorobenzene and other halogenated aromatic compounds with hydroxyl amines, there may be mentioned reaction of such halides with ammonia and with hydrogen in the presence of the magnesia compounds to produce other amines.

Ethyl bromide may be converted into vinyl bromide through intra-dehydro-halogenation by treating the ethyl bromide with an active magnesia of the present invention with or without an addition of alcoholic potassium hydroxide. In a similar manner s-tetrachloroethane may be converted to trichloroethylene.

Naphthoyl chloride or other similar aromatic compound is reacted with hydrogen in the presence of the active magnesium catalyst thereby producing naphthyl aldehyde having a boiling point of 290° C., hydrogen chloride being obtained as a by-product.

Ethyl bromide and hydrogen sulphide reacted in the presence of the active magnesia of the present invention and as a result ethyl mercaptan may be obtained. In a similar manner other organic halides may be reacted with hydrogen sulphide or with a mercaptan or hydrogen cyanide to provide other mercaptans or thioethers or cyanides, respectively.

Toluene and chlorine are reacted in the liquid phase to produce benzyl chloride having a boiling point of 179°. Reaction of these same two materials or between other hydrocarbons and halogen may be conducted in the gaseous phase at elevated temperatures and by such treatment side chain halogenation may occur. The active magnesia may be employed alone as the catalyst or may be employed together with other catalysts known for the purpose. Chlorine or sulphonyl chloride may be caused to react in a similar manner with other aromatic compounds.

Pentadiene or 1-methyl-butadiene may be reacted with ammonia in the presence of a highly active magnesia thereby to provide 1-aminopentene-2. Chloro-benzene is heated at a high temperature and high pressure in the presence of the active magnesia catalyst and as a result aniline may be obtained. This reaction may be carried out in the liquid phase or in the vapor phase in which the chlorobenzene is passed over or through the magnesia catalyst. The same or a different aromatic amine, such as beta-naphthyl amine may be obtained by reacting beta-naphthol with ammonia in the presence of the active magnesia, the reaction being assisted by a somewhat elevated temperature and under increased pressure. In like manner resorcinol may be converted to o-aminophenol by reacting the same in the presence of the active magnesia and aqueous ammonia in an autoclave at elevated temperature and pressure. Vapors of chlorobenzene and hydroxyl amine are passed over or through a bed of the active magnesia and as a result phenyl hydroxyl amine may be obtained.

Other reactions contemplated by the present invention in which active magnesia is employed, preferably in vapor phase reactions, include the production of cyanides from alcohols and hydrogen cyanide, the production of mercaptans by the reaction of alcohol with hydrogen sulfide and the production of various amides by the reaction of amines and organic acids. Benzene, hydrogen chloride and oxygen may react at an elevated temperature in the presence of active magnesia and as a result chlorobenzene may be obtained. Dichlorobenzene is reacted at an elevated temperature under light pressure in the presence of the active magnesia with or without the addition of sodium hydroxide and as a result catechol may be produced.

Benzyl trichloride after being converted to benzyl trihydroxide in known manner is volatilized with steam and passed over the active magnesia and as a result benzoic acid may be produced.

A C5 cut of natural gasolines is chlorinated in conventional manner and the resulting compounds are hydrolyzed in the vapor phase by treating the same with a large mole ratio of steam to the chlorides in the presence of active magnesia. As a result amyl alcohols composed of mixtures of various isomers may be obtained.

The iodine number determinations of the magnesias of the present invention were made in accordance with the procedure set forth in the hereinbefore cited article entitled "Active Magnesia," page 70.

It should be understood that the present invention is not limited to the specific procedures and compounds set forth herein but that it extends to all equivalent materials and conditions known to the art of catalysis which will occur to those skilled in the art upon consideration of the scope of the claims appended hereto.

We claim:

1. In the process of isomerizing an unsaturated carbon compound containing at least one carbon-to-carbon double bond, the improvement comprising heating the compound in the presence of a catalyst comprising active magnesia having an iodine value of at least 30, at a temperature and for a time sufficient to effect substantial isomerization of the compound and consequent relocation of the double bond.

2. The process of claim 1 wherein the unsaturated carbon compound is an unsaturated glyceride oil.

3. The process of claim 1 wherein the unsaturated carbon compound is an unsaturated hydrocarbon.

ALBERT C. ZETTLEMOYER.
WILLIAM C. WALKER.

References Cited in the file of this patent

UNITED STATES PATENTS

| Number | Name | Date |
|---|---|---|
| 1,495,776 | Burdick | May 27, 1924 |
| 2,219,725 | Seaton | Oct. 29, 1940 |
| 2,219,726 | Seaton | Oct. 29, 1940 |
| 2,234,367 | Chesny | Mar. 11, 1941 |
| 2,410,890 | Mason | Nov. 12, 1946 |
| 2,447,181 | Butterbaugh | Aug. 17, 1948 |

OTHER REFERENCES

Rubinshtein: Rontgenographic Study of Catalysts of MgO, 1945, Chemical Abstracts, page 1588.

Rubinshtein: Primary Submicroscopic Crystals in Heterogeneous Catalysis, 1946, Chemical Abstracts, page 6325.

A. C. Zettlemoyer and W. C. Walker: Industrial and Engineering Chemistry, vol. 39, January 1947, pages 69–74.